US008600978B2

(12) United States Patent
  Cherng et al.

(10) Patent No.: US 8,600,978 B2
(45) Date of Patent: Dec. 3, 2013

(54) DIVERSE ROUTE ADJUSTMENT TOOL

(75) Inventors: Shu-Yi Cherng, Plano, TX (US); Sandy Vines, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 626 days.

(21) Appl. No.: 12/640,237

(22) Filed: Dec. 17, 2009

(65) Prior Publication Data

US 2011/0153549 A1    Jun. 23, 2011

(51) Int. Cl.
  *G06F 7/00*    (2006.01)
  *G06F 17/30*    (2006.01)

(52) U.S. Cl.
  USPC .......................................... 707/722; 707/758

(58) Field of Classification Search
  USPC .................. 707/705, 722, 758, 769
  See application file for complete search history.

(56) References Cited

U.S. PATENT DOCUMENTS

| | | | |
|---|---|---|---|
| 5,884,315 A * | 3/1999 | Dunn | 707/102 |
| 6,802,044 B2 * | 10/2004 | Campbell et al. | 716/126 |
| 7,113,949 B1 * | 9/2006 | House et al. | 707/10 |
| 7,164,888 B2 * | 1/2007 | Zerressen | 455/67.11 |
| 7,639,793 B1 * | 12/2009 | Croak et al. | 379/221.01 |
| 7,804,778 B1 * | 9/2010 | Begalke et al. | 370/234 |
| 7,904,444 B1 * | 3/2011 | Koudas et al. | 707/713 |
| 2005/0262071 A1 * | 11/2005 | Prager | 707/4 |
| 2009/0069623 A1 * | 3/2009 | Oh | 600/1 |
| 2009/0080343 A1 * | 3/2009 | Simmons et al. | 370/254 |

* cited by examiner

*Primary Examiner* — Marc Somers

(57) ABSTRACT

A system for and method of analyzing the diversity of a set of voice network circuits is disclosed. The system and method compile identifying information representing voice network circuits and store this information in a database. The system and method analyze the database, which represents a set of voice networks, to determine whether there are any route diversity violations. If route diversity violations exist, a violation report can be created. The violation report can include schematic diagrams of each non-diverse route with common points and also a summary of the violations. From the violation report, the nature of the correction—e.g., remote access or manual field intervention—may be determined.

17 Claims, 6 Drawing Sheets

DIVERSE ROUTE ADJUSTMENT TOOL

BACKGROUND INFORMATION

Complete interruptions of service are unacceptable in a typical voice network. For example, 911 calls and air traffic control notices may be transported over such a voice network. A complete service interruption could result in catastrophic consequences. Therefore, voice networks are designed such that voice data could be transmitted between two locations over distinct paths routes. This way, an outage of a single circuit does not result in a complete service outage for the voice network. Typically, three way diversity, or three distinct routes between data points, may be preferred for sufficient voice network robustness.

Many voice networks that exist today are combinations of multiple independent networks merged together to form a single network. Ensuring diversity in a network formed from previously independent networks has become a difficult task because the protocols and naming conventions of the several different networks are different.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
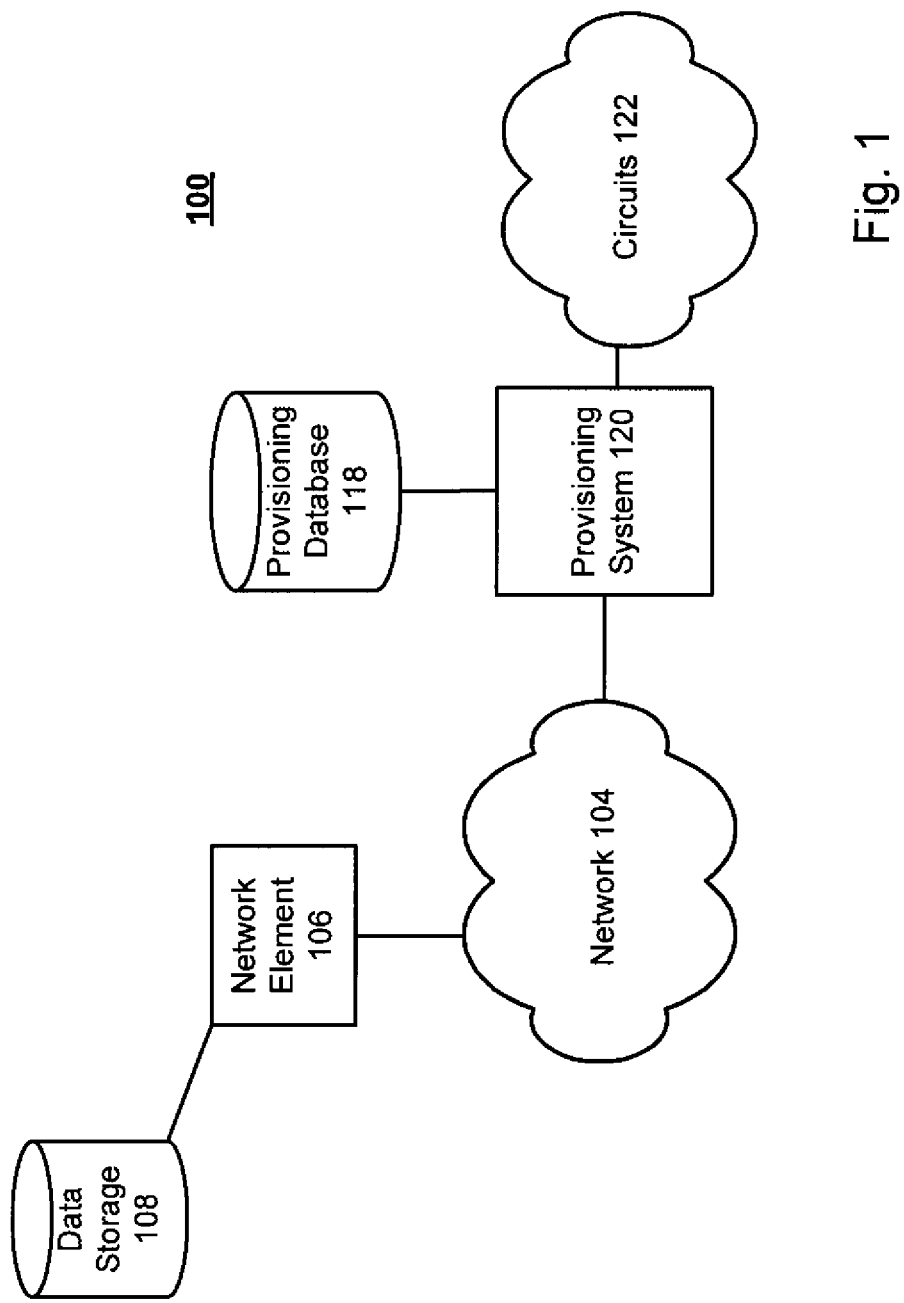
FIG. 1 is a schematic diagram illustrating a system for analyzing different voice networks to identify route diversity violations, in accordance with exemplary embodiments.

Circuits in a network may be considered critical or important because a service interruption of circuits could negatively impact the provision of, for example, telecommunications services to a particular geographic area. Because of this, it may be desired to have three-way diversity on links across networks. Because of periodic network grooming, which is a process of combining or segregating network traffic, it may not be feasible to check thousands of links for diversity violations and manually check that routes are diverse or maintain diversity in a network.

As an example, the merging of multiple voice networks into an aggregate voice network operated by a single entity may result in multiple systems with different identification nomenclature for points on the network. As a result, it may be difficult for network engineers to identify diversity violation problems across multiple networks. In various embodiments of the present disclosure, a database may be compiled, which cross-references different site names on a merged voice network.

In some embodiments, a diverse route adjustment tool may log into, for example, three separate network systems. The tool may compare primary and secondary paths for links in the network systems. The tool may then create an entry in an internal database tool for tracking the links and/or diversity violations. The tool may then create a drawing of each non-diverse route with common points. The tool may then provide a summary of the violations found.

The diverse route adjustment tool may receive or request data from other sources. The additional sources may include, but are not limited to, tools used to create circuit orders that interface with mainframe systems to create physical paths, or network data management systems that support and house data related to circuits in the network, such as link number, signal transfer point (STP) pair, and utilization data. By interfacing with these other sources, the tool may provide users with more data to determine if there are outstanding orders for messages being blocked, pending, or if the violation is invalid. For simple corrections, orders may be created on available diverse equipment to correct the violation. For corrections that may require manual field intervention, orders may be created on available diverse equipment to correct the violation and send the order information to provisioning engineers.

The description below describes servers, network elements, and databases that may include one or more modules, some of which are explicitly shown in the figures, others that are not. As used herein, the term "module" may be understood to refer to computer executable software, embedded on a computer readable medium, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, databases, or other components) separately. The functions described as being performed at various components may be performed at other components, and the various components may be combined and/or separated. Other modifications may also be made.

FIG. 1 is a schematic diagram illustrating a system for analyzing different voice networks to identify route diversity violations, in accordance with exemplary embodiments. While voice networks are shown in the example, the use of voice networks is exemplary only, and the system is not limited to voice networks. Networks that carry any kind of data may be analyzed. As shown in the illustrated embodiment, system 100 can operate in a networked environment.

The network 104 may be a wired network, a wireless network, or combinations thereof. The network 104 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 104 may include, without limitation, telephone line, fiber optics, IEEE Ethernet 802.3, a wide area network ("WAN"), a local area network ("LAN"), or a global network such as the Internet. Also, network 104 may support, an Internet network, a wireless communication network, a cellular network, or the like, or any combination thereof. Network 104 may further include one, or any number of the exemplary types of networks mentioned above operating as a stand-alone network or in cooperation with each other. Network 104 may utilize one or more protocols of one or more network elements to which it is communicatively coupled. Network 104 may translate to or from other protocols to one or more protocols of network devices. Although network 104 is depicted as one network, it should be appreciated that according to one or more embodiments, network 104 may comprise a plurality of interconnected networks, such as, for example, a service provider network, the Internet, a broadcaster's network, a cable television network, corporate networks, and home networks.

Network 104 can be in communication with a collection of telecommunication circuits (collectively referenced using numeral 122). Circuits 122 may be a collection of nodes and links (not shown). The nodes and links (not shown) may carry data. For example, and without limitation, the nodes and links may carry data and may function as one or more voice networks. Network 104 may be in communication with a collection of circuits and/or voice networks through provisioning system 120, as illustrated. Network 104 may be coupled directly to circuits 122 through a router or other telecommunication device, or network 104 could comprise circuits 122. It should be appreciated that the network configuration illustrated in FIG. 1 is purely exemplary and not limiting.

Provisioning system 120 may be any system that allows for the provisioning and/or identification of circuits 122. Provisioning system 120 may be a computer of some type, with a processor (not shown), a memory device, such as a random-access memory ("RAM"), and one or more storage devices, such as disk drives, optical media, CDROM drives, or other types of storage device. The provisioning system 120 may analyze the circuits 122, or may receive data related to circuits 122 for analysis.

In some embodiments, provisioning database 118 may be in communication with provisioning system 120, and can store the information created or used by provisioning system 120. In particular, provisioning database 118 can store information about circuits 122, including, for instance, the origination and termination points of each circuit, as well as all telecommunication resources used by the circuit, including the physical locations of the resources. In certain embodiments, provisioning database 118 can include additional information about circuits 122, as well as additional information about the telecommunication resources used by circuits 122. Such information may include, by way of non-limiting example, the type, nature and location of such resources. Specifically, such information may include the manufacturer of each resource and any incompatibilities among different resources. In some embodiments, provisioning database 118 may be stored on a storage device within provisioning system 120. In some embodiments, provisioning system 120 may be in communication with provisioning database 118, either directly or through network 104 or circuits 122.

Network element 106 may be in communication with network 104. Network element 106 may be communicatively coupled with data storage 108, and data storage 108 may be allocated to store information regarding the voice network and its connections. Network element 106 may be a server which may be configured to execute applications related to the modeling of the voice network or circuits 122, the updating of that data when necessary, and determination on whether a diversity route violation may have occurred. Network element 106 may be a server configured to interface with provisioning database 118. The two devices may be interfaced via provisioning system 120. The two devices may be interfaced directly via network 104.

Figure 2:
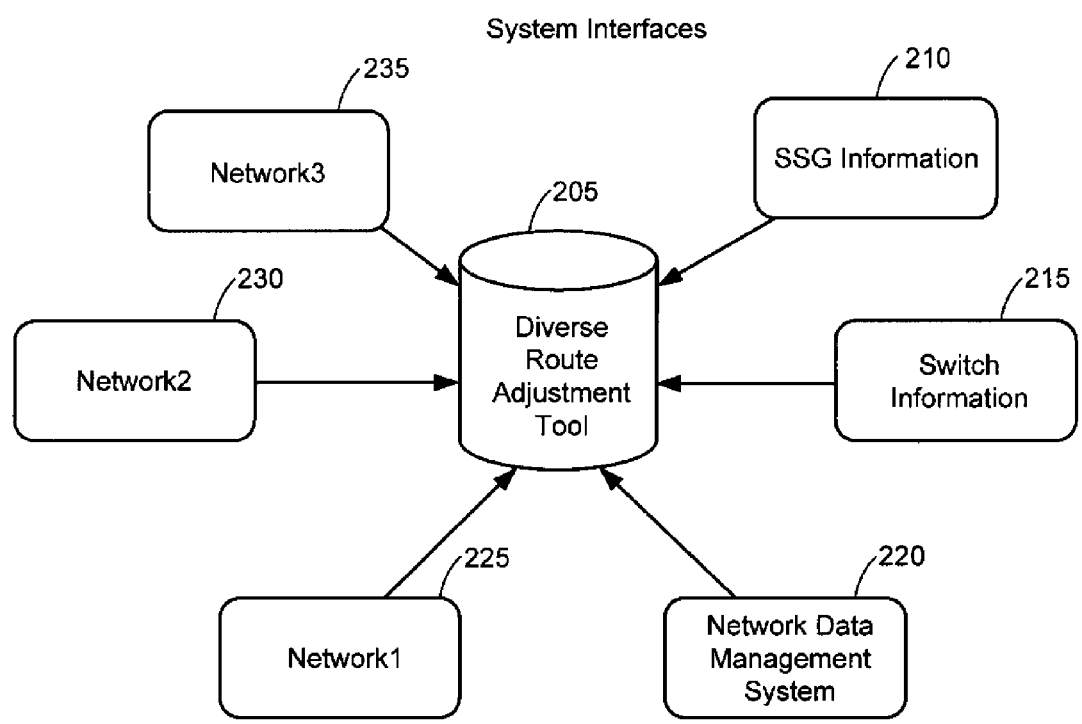
FIG. 2 is a schematic diagram illustrating a diverse route adjustment tool and the networks and databases where it acquires the data necessary to identify route diversity violations, in accordance with exemplary embodiments.

FIG. 2 is a schematic diagram illustrating a diverse route adjustment tool and the networks and databases it may utilize to acquire the data for identifying route diversity violations, in accordance with exemplary embodiments. FIG. 2 illustrates that the diverse route adjustment tool 205 gathers data from, for example, six different sources. Boxes 225, 230, and 235 may be examples of networks, shown as Network1, Network2, and Network3. For example, the networks shown as boxes 225, 230, and 235 may have been networks that were formerly independent, but have subsequently been merged into a single network. SSG Information 210 may refer to information collected from a signal transfer point ("STP"), from which links within the network or networks originate. The links may terminate at a switch, and information may be obtained from the switch or collection of switches, shown in box 215. SSG information 210 and switch information 215 may be used to identify and/or classify links. The diverse route adjustment tool may also collect information from one or more other network data management systems 220, which may contain information about one or more links.

Figure 3:
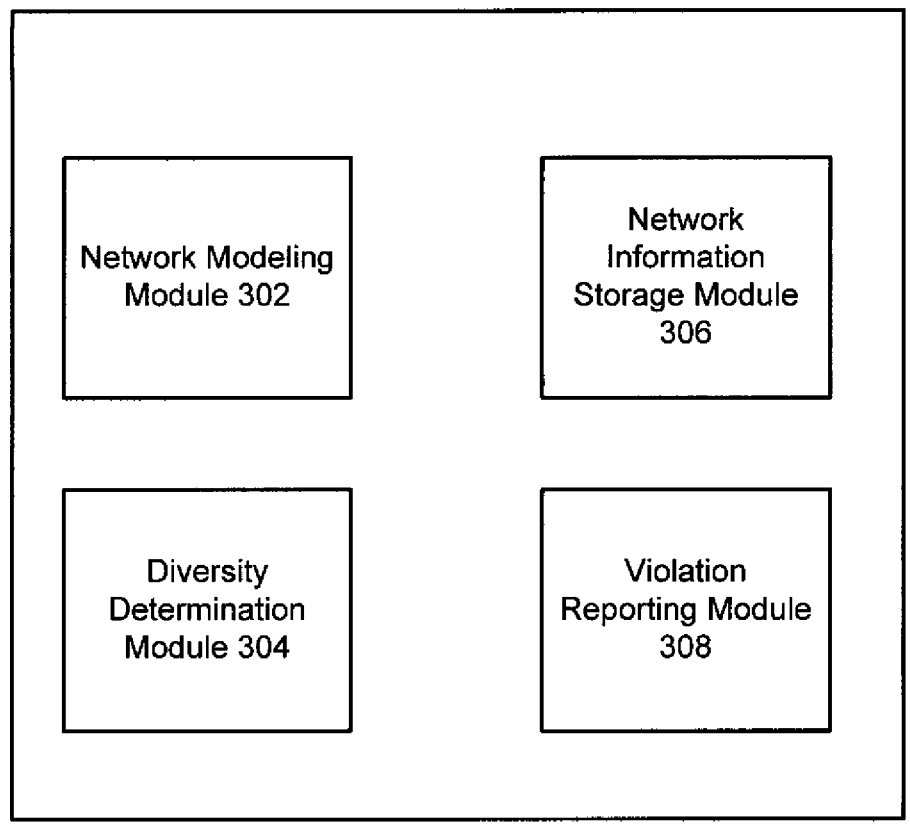
FIG. 3 is a block diagram illustrating exemplary modules of a hardware component of a system for identifying route diversity violations, in accordance with exemplary embodiments.

FIG. 3 is a block diagram illustrating exemplary modules of a hardware component of a system 300 for identifying route diversity violations, in accordance with exemplary embodiments. The system 300 may comprise a network modeling module 302, a diversity determination module 304, a network information storage module 306, and a violation reporting module 308. The modules may be embodied in hardware, or may be embodied in software, or a combination of hardware or software. The modules may be in communication with each other. The modules may reside on the same physical system, or may reside on more than one physical system, and may be in communication with each other via the network 104, or other connection. The modules may be distinct and may be in communication with each other, or functions of the modules may be embodied in a combination of the modules.

Network modeling module 302 may include software applications and hardware devices which may acquire information about one or more voice networks, which may be a collection of different voice networks that have been merged together and may include one or more circuits. Network modeling module 302 may work in conjunction with network information storage module 306 to store data that defines the one or more voice networks, and to allow the network modeling module 302 to cross-reference site codes between the one or more voice networks.

Diversity determination module 304 may include software applications and hardware devices that may analyze the network data acquired by network modeling module 302. Diversity determination module 304 may look at each of the circuits in each of the networks to find any common points. The finding of a common point may indicate that a diversity violation exists. Route diversity, in other words, could also be thought of as the independence of routes. Two routes or links that do not cross paths or share a common point between an originating point and a destination point in the one or more voice networks may be thought of as independent of one another. It follows that a failure of one or more points of one of those links will not also cause the failure of the other link. Three-way diversity may exist where there exist three routes or links between an originating point and a destination point that do not share a common point. In order to maintain three-way diversity, there cannot be common points between the three links between an originating point and a destination point.

Network information storage module 306 may work in conjunction with network modeling module 302 and diversity determination module 304. Network information module 306 may interface with memory, a database, or other data storage device or system, and may store the network data acquired by the network modeling module 302. Network information storage module 306 may also work in conjunction with diversity determination module 304 by storing diversity violation information such that discovered violations may be tracked until the violation is corrected.

Violation reporting module 308 may include software applications and hardware devices configured to create diversity violation reports. Diversity violation reports may include schematic diagrams of the non-diverse routes, where the common points that create the diversity violation are indicated. Diversity reporting module may also include a summary of the violations found. This information provided by the violation reporting module 308 may also indicate whether the diversity violation can be corrected remotely by sending instructions, or whether a manual field intervention may be necessary to correct the diversity violation.

Figure 4A:
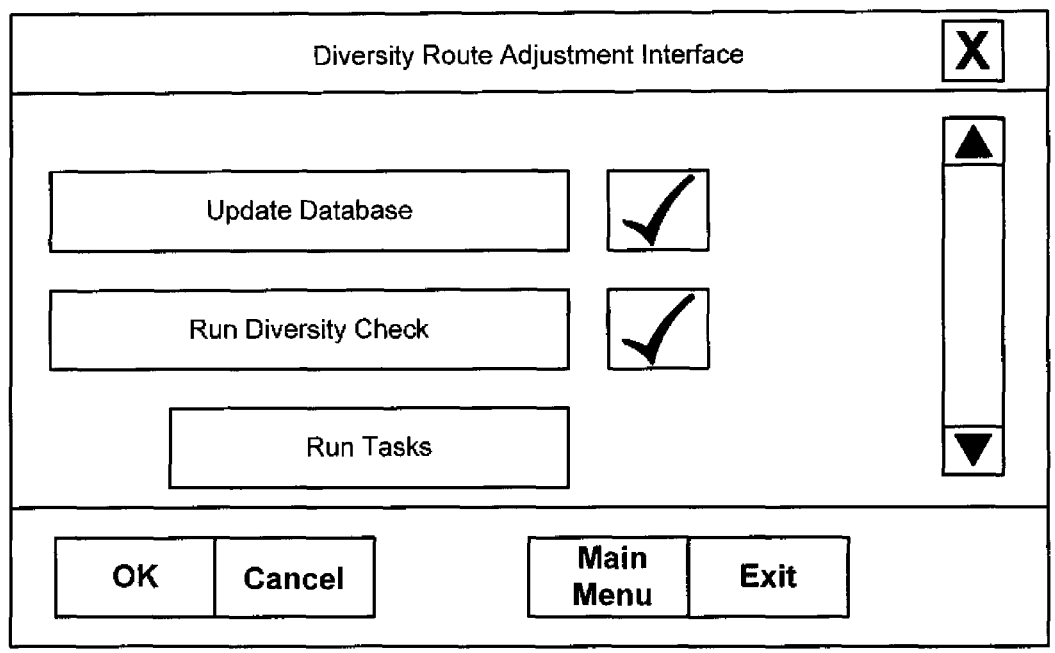
FIG. 4(a) illustrates the appearance of a user interface of the diversity route adjustment tool, in accordance with exemplary embodiments.

FIG. 4(a) illustrates the appearance of a user interface 400 of the diversity route adjustment tool, in accordance with exemplary embodiments. A user of the diversity route adjustment tool may select one or both of the options of updating the database with information from different networks and running the diversity check to see if anything in the networks has, by way of non-limiting example, the same equipment, the same building codes, or any other data indicative of a diversity violation. If a diversity violation is found, a user may be presented with an interface such as that shown in FIG. 4(b). Updating the database with information from different networks may comprise an analysis of the one or more voice networks, or retrieving data from another system related to one or more of the one or more voice networks, and adding the information to a database. Running the diversity check may comprise, for example, analyzing the database to determine if routes or links in one or more of the voice networks share a common point between an originating point and a destination point.

Figure 4B:
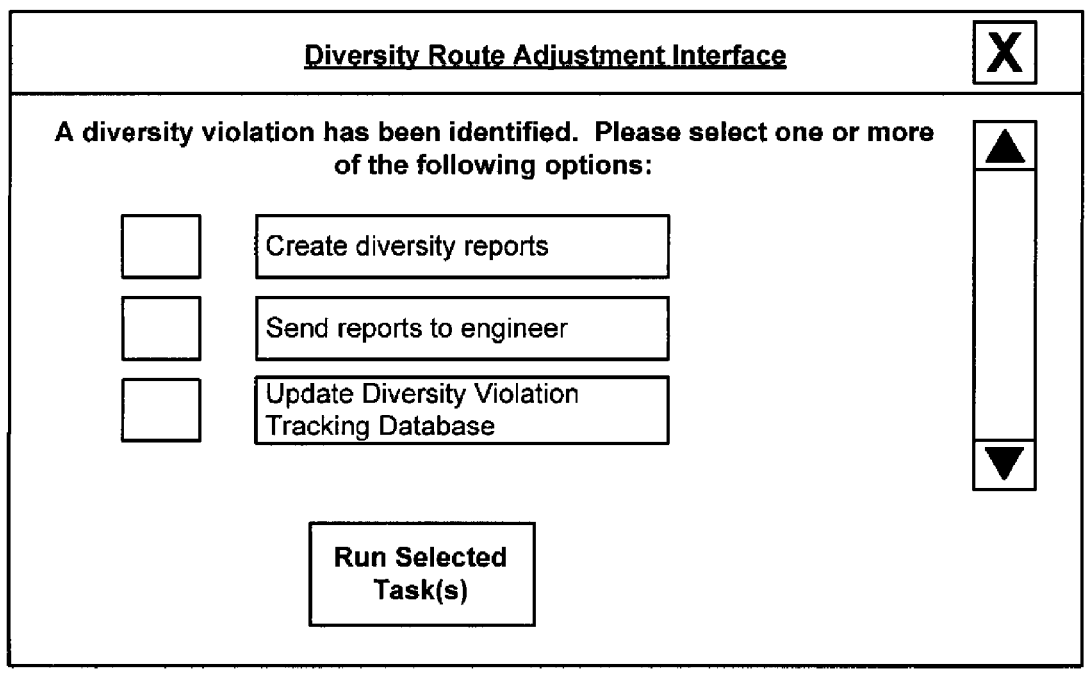
FIG. 4(b) illustrates the appearance of a user interface of the diversity route adjustment tool, in accordance with exemplary embodiments.

FIG. 4(b) illustrates the appearance of a user interface 450 of the diversity route adjustment tool, in accordance with exemplary embodiments. Similar to FIG. 4(a), the interface of FIG. 4(b) may provide a user with the option of choosing some or all of the three tasks and then running those tasks. The first task that the user may choose is to create a diversity report. A diversity report may include a summary of information about diversity violations, and may also include a schematic diagram, showing common points in the diversity violations. The second option may allow the user to send the diversity report to an engineer so that the problem may be resolved. The report may be transmitted via e-mail, for example, or may be transmitted to another system that the engineer may use to receive and review the information. The third option may be to update an internal database or a diversity violation tracking database with the information that a diversity violation has occurred, where the internal database may include information related to identifying and/or tracking the diversity violation. Updating the internal database may allow for the violation to be tracked until the issue is resolved.

Figure 5:
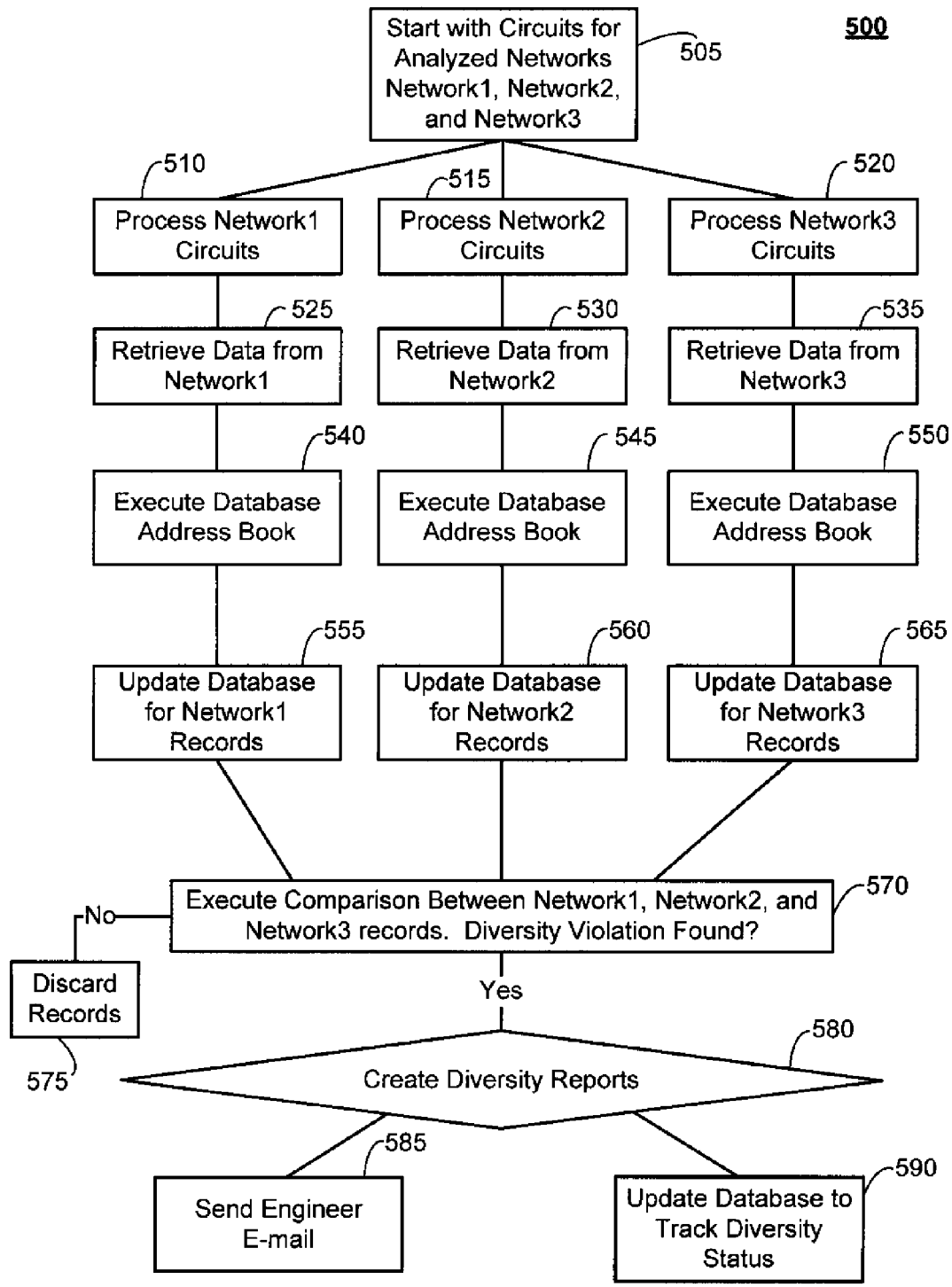
FIG. 5 is a flowchart illustrating a method for gathering network data into a database and performing analysis to determine whether there are any route diversity violations, in accordance with exemplary embodiments.

FIG. 5 is a flowchart illustrating a method for gathering network data into a database and performing analysis to determine whether there are any route diversity violations, in accordance with exemplary embodiments. The method 500 may begin at box 505, and the method may begin by identifying the circuits and the networks that the method may use to identify routes. In FIG. 5, the three different networks are shown as Network1, Network2, and Network3. It should be appreciated, however, that these networks are provided in a purely exemplary manner. The diversity route adjustment tool is by no means limited to gathering information from these three networks. The method may receive and process the information from the networks substantially in parallel, or may receive and process the information from the networks one at a time, or may receive and process the information from the networks in one or more groups at different times. The steps for Network1 are explained in greater detail below, and similar steps may be used for Network2 and Network3 in the exemplary method 500.

In box 510, the circuits in the Network1 network are processed. During the processing of the circuits, data is retrieved from the Network1 system that matches the equipment from all sites on the physical path for the circuits in the Network1 network. The data acquired when the Network1 network is processed may include information about the links in the Network1 network. In box 525, the data regarding the circuits in the Network1 network are retrieved from the Network1 network. The data acquired about the Network1 network includes information about the links in the Network1 network. Because the different networks may use different naming conventions, a piece of network equipment, such as a switch, for example, may have different names in one or more of the networks.

In box 540, a database address book is created and populated with data regarding the Network1 network. The site and address information from the Network1 network from box 525 may be placed into a file. The file may be, for example and without limitation, a relational database or any other kind or type of database file or other file to store and recall information.

In box 555, a central database, or a provisioning database, is created or an existing central database is updated with the information from the database address book for the Network 1 network in box 540. Combined with the information from the database address book for the other networks, the central database may comprise data related to the sites from the circuit list that form a cross reference of sites from all of the networks. The different equipment names corresponding to the different networks may be cross-referenced against each other in the database so that an accurate model of a voice network made up of several different networks may be acquired.

Similar steps may be preformed for Network2, shown in boxes 515, 530, 545, and 560, and Network3, shown in boxes 520, 535, 550, and 565. The information from the networks may be combined into the central database. Again, it should be noted that FIG. 5 illustrates this process for three networks in a purely exemplary fashion. The process is not limited to exactly three different networks, and may include either more networks or fewer networks.

At box 570, the central database has been updated with information from each of Network1, Network2, and Network3. One or more algorithms may be run on the data in the central database to compare and analyze all the collected information and determine whether there is a route diversity violation. In one exemplary embodiment, a join operation is performed on the information in the central database to determine if a diversity violation is present. If a diversity violation is not present, the records are discarded in box 575, and the method 500 may end.

If there is a diversity violation, one or more reports may be created related to the one or more violations, shown in box 580. The report or reports may include schematic diagrams of the common points, and may also include a summary of the information yielding the diversity violation. The report or reports may indicate whether the diversity violation is such that a manual field intervention will be necessary to remedy the problem. At box 585, the report or reports may be sent to an engineer, who may implement a solution based on the diversity violation report. Further, at box 590, the diversity information identified and described in the diversity violation report may be added to the central database, so that status of the diversity violation may be tracked. The central database may be updated with the resolution of the diversity violation so that no outstanding violations remain in the database after they have been resolved, and information related to the diversity violation is managed in the central database. Alternatively, another database may be used to store the diversity information.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
   using a computer processor, processing at least three voice networks;
   using the computer processor, retrieving data from the processed voice networks, wherein the retrieved data comprises information identifying each of the processed voice networks;
   using the computer processor, updating records of a database with the retrieved data from the processed voice networks;
   using the computer processor, comparing records of each of the voice networks against records of the at least one other of the voice networks to determine whether a common point exists;
   using the computer processor, determining whether a three way diversity violation exists based on the comparison;
   using the computer processor, creating one or more diversity reports if one or more three way diversity violations exist, wherein the diversity report comprises an indication as to whether manual field intervention is necessary to remedy the diversity violation; and
   using the computer processor, tracking the status of the one or more diversity violations.

2. The method according to claim 1, wherein each of the voice networks has a unique naming convention for elements of the voice network.

3. The method according to claim 1, wherein the determination of whether a three way diversity violation exists comprises determining whether there is a common point between three links.

4. The method according to claim 3, wherein the determination of whether there is a common point between links comprises a data join operation.

5. The method according to claim 1, wherein the diversity report comprises a schematic diagram of the non-diverse links.

6. The method according to claim 1, wherein the diversity report comprises a summary of the violations.

7. The method according to claim 1, wherein the updating of the database comprises cross-referencing identifiers for common devices between the voice networks.

8. A non-transitory computer readable media tangibly embodying code to perform the acts of the method of claim 1.

9. A device comprising:
   a computer processor; and
   a memory comprising:
   a network modeling module configured to retrieve and store information about at least three of voice networks;
   a diversity determination module configured to determine whether three way route diversity exists between three or more links;
   a network information storage module configured to store and relate the data representing the voice networks, and further configured to store information regarding diversity violations;
   a diversity violation reporting module configured to create reports describing diversity violations with diagrams and summaries, wherein the diversity report comprises an indication as to whether manual field intervention is necessary to remedy the diversity violation; and
   a tracking module that tracks the status of the diversity violations.

10. A system comprising:
   a device communicatively coupled to at least three of voice networks;
   at least one database communicatively coupled to the device;
   at least one processor communicatively coupled to the device and to the at least one database, wherein the at least one processor is configured to:
   process the voice networks;
   retrieve data from the processed voice networks, wherein the retrieved data comprises information identifying each of the processed voice networks;
   update the records of a database with the retrieved data from the processed voice networks;
   compare the records of each of the voice networks against the records of the at least one other of the voice networks;
   determine whether a three way diversity violation exists; and
   create one or more diversity reports if one or more three way diversity violations exist wherein the diversity report comprises an indication as to whether manual field intervention is necessary to remedy the diversity violation; and
   track the status of the one or more three way diversity violations.

11. The system according to claim 10, wherein each of the voice networks has a unique naming convention for elements of the voice network.

12. The system according to claim 11, wherein the voice networks are merged into a single voice network.

13. The system according to claim 10, wherein the determination of whether a three way diversity violation exists comprises determining whether there is a common point between three links.

14. The system according to claim 13, wherein the determination of whether there is a common point between links comprises a data join operation.

15. The system according to claim 10, wherein the diversity report comprises a schematic diagram of the non-diverse links.

16. The system according to claim 10, wherein the diversity report comprises a summary of the violations.

17. The system according to claim 10, wherein the updating of the database comprises cross-referencing identifiers for common devices between the plurality of voice networks.

* * * * *